(12) United States Patent
Hamada

(10) Patent No.: US 8,310,338 B2
(45) Date of Patent: Nov. 13, 2012

(54) SMART KEYLESS ENTRY SYSTEM

(75) Inventor: Yasushi Hamada, Hiroshima (JP)

(73) Assignee: Mazda Motor Corporation (JP)

( * ) Notice: Subject to any disclaimer, the term of this patent is extended or adjusted under 35 U.S.C. 154(b) by 975 days.

(21) Appl. No.: 12/277,453

(22) Filed: Nov. 25, 2008

(65) Prior Publication Data

US 2009/0153295 A1   Jun. 18, 2009

(30) Foreign Application Priority Data

Dec. 12, 2007  (JP) ................................. 2007-321038

(51) Int. Cl.
*G08B 29/00*  (2006.01)

(52) U.S. Cl. ........ 340/5.64; 340/5.7; 340/5.6; 340/5.61; 340/5.62

(58) Field of Classification Search ................ 340/5.61, 340/5.62, 5.63, 5.64, 426.11, 426.13, 426.17, 340/442, 10.3, 10.1, 10.6; 341/176
See application file for complete search history.

(56) References Cited

U.S. PATENT DOCUMENTS

| | | | |
|---|---|---|---|
| 6,522,027 B1* | 2/2003 | Morillon et al. | 307/10.3 |
| 2001/0003405 A1* | 6/2001 | Morillon | 307/10.5 |
| 2004/0070489 A1* | 4/2004 | Ueda et al. | 340/5.61 |
| 2005/0258686 A1* | 11/2005 | Hiramitsu et al. | 307/10.1 |
| 2006/0114100 A1* | 6/2006 | Ghabra et al. | 340/5.61 |

FOREIGN PATENT DOCUMENTS

| | | |
|---|---|---|
| DE | 19542441 A1 | 5/1997 |
| DE | 10045762 A1 | 4/2002 |
| DE | 10 2006 001939 A1 | 8/2007 |
| EP | 1228931 A2 | 8/2002 |
| JP | 2006-104664 | 4/2006 |

OTHER PUBLICATIONS

European Search Report dated Sep. 17, 2009; Application No. / Patent No. 08020240.1-1264 / 2070780.

* cited by examiner

*Primary Examiner* — Nabil Syed
(74) *Attorney, Agent, or Firm* — Studebaker & Brackett PC; Donald R. Studebaker

(57) ABSTRACT

A transmitting antenna to transmit a request signal in a vehicle compartment is disposed off the center line of the vehicle compartment in a vehicle width direction. The output strength of the request signal transmitted by the transmitting antenna is switched in such a manner that a receivable output range of the request signal by a portable device reaches one of both doors which is equipped with one of access switches which has been operated. Accordingly, it can be properly recognized whether the portable device is located inside the vehicle compartment or outside the vehicle compartment even if the transmitter to transmit the request signal in the vehicle compartment is disposed off the center line of the vehicle compartment in the vehicle width direction.

4 Claims, 7 Drawing Sheets

PRIOR ART

SMART KEYLESS ENTRY SYSTEM

BACKGROUND OF THE INVENTION

The present invention relates to a smart keyless entry system, and more specifically relates to a smart keyless entry system in which a transmitter of an onboard device is disposed at a specified position which is off the center line of a vehicle compartment in a vehicle width direction.

The smart keyless entry system of the vehicle has been widely used in these days. A portable device of the smart keyless entry system performs the role of a conventional mechanical key. For example, when a card-shaped portable device is carried in a pocket or a bag, a door lock/unlock, an engine start and the like can be operated without using the key. In order to perform such a function, the vehicle is equipped with an onboard device operative to transmit a request signal in response to operations of access switches provided at outer faces of doors. The portable device transmits a receipt-acknowledge signal, such as an ID signal, in response to the request signal from the onboard device. When the ID signal from the portable device is verified (recognized), the onboard device activates onboard control devices to operate their functions, such as a door lock mechanism operative to unlock the door.

Japanese Patent Laid-Open Publication No. 2006-104664 discloses an example of such a smart keyless entry system in which the LF transmitting antennas are disposed at some points in the vehicle compartment.

In general, the output range of the signal from the transmitting antenna, which has sufficient signal strength, of the smart keyless entry system is of a circular shape with its center at the transmitting antenna. Therefore, it may be preferable that the transmitting antenna operative to transmit the request signal to the portable device be disposed on the center line of the vehicle compartment in the vehicle width direction.

However, on or around the center line of a front portion of the vehicle compartment in the vehicle width direction are provided various components, such as a console and a parking brake. Accordingly, it may be difficult to dispose the transmitting antenna of the onboard device of the smart keyless entry system at the central portion of the front portion of the vehicle compartment in the vehicle width direction.

Herein, in a case in which the transmitting antenna is disposed at a specified portion which is off this center line of the vehicle compartment, the respective distances from the transmitting antenna to the both-side doors of the vehicle would be different from each other. As a result, the signal strength of the respective request signals at the both-side doors become different from each other.

Therefore, if the output strength of the transmitting antenna is set in such a manner that its output range reaches one of the doors which is closer to the transmitting antenna than the other door, without reaching the other door, for example, the area of the other door is out of the output range of the request signal, so that there is a concern that it may be recognized (determined) by mistake that the portable device is located outside the vehicle compartment despite the inside existence of the portable device in the vehicle compartment. This may cause a problem in that the door is locked, leaving the portable device inside the vehicle compartment.

In the meantime, if the output strength of the transmitting antenna is set in such a manner that its output range can also reach the other door which is located further from the transmitting antenna, the closer door is included within the output range of the request signal. As a result, the portable device may be mistakenly recognized to be located inside the vehicle compartment despite its location outside the vehicle compartment. In this case, there may occur a situation in which the door unlock is not conducted even if the access switch at the door is operated.

SUMMARY OF THE INVENTION

An object of the present invention is to provide a smart keyless entry system which can properly recognize whether the portable device is located inside the vehicle compartment or outside the vehicle compartment even if the transmitter operative to transmit the request signal in the vehicle compartment is disposed at the specified position which is off the center line of the vehicle compartment in the vehicle width direction.

According to the present invention, there is provided a smart keyless entry system, comprising switches provided at outer faces of both-side doors of a vehicle, an onboard device operative transmit a request signal in response to operation of the switches, a portable device operative to transmit a receipt-acknowledgement signal in response to receiving the request signal, an onboard control device to be activated by the onboard device in response to receiving the receipt-acknowledgment signal, wherein said onboard device comprises a vehicle-inside transmitter to transmit the request signal in a vehicle compartment, the vehicle-inside transmitter comprises a switching transmitter which is disposed at a specified position which is off the center line of the vehicle compartment in a vehicle width direction, and the onboard device is configured so as to switch an output strength of the request signal transmitted by the switching transmitter in such a manner that a receivable output range of the request signal by said portable device reaches one of the doors which is equipped with the switch which has been operated.

According to the present invention, in a case in which the switch of the near-side door from the switching transmitter is operated, the output strength is set to be weaker in such a manner that the output range reaches the near-side door. On the other hand, in a case in which the switch of the far-side door, the output strength is set to be stronger in such a manner that the output range expands to the far-side door. Thereby, it can be properly recognized whether the portable device is located inside the vehicle compartment or outside the vehicle compartment even if the transmitter operative to transmit the request signal in the vehicle compartment is disposed at the specified position which is off the center line of the vehicle compartment in the vehicle width direction.

According to an embodiment of the present invention, the vehicle-inside transmitter comprises plural transmitters which are disposed at a front portion and a rear portion in the vehicle compartment respectively, and the transmitter at the front portion is the switching transmitter. Thereby, since the transmitter can be easily provided at the central portion of the rear portion in the vehicle compartment, the efficient layout of the output range can be provided by applying the switching transmitter to the transmitter disposed at the front portion.

According to another embodiment of the present invention, the switching transmitter at the front portion is disposed on a vehicle floor below a driver's seat. Thereby, the effective disposition of the switching transmitter can be provided.

According to another embodiment of the present invention, the request signal is a signal of LF (Long Frequency) band, and the receipt-acknowledgement signal is a signal of UHF (Ultrahigh Frequency) band.

Other features, aspects, and advantages of the present invention will become apparent from the following description which refers to the accompanying drawings.

BRIEF DESCRIPTION OF THE DRAWINGS

FIG. 6A for a case in which a vehicle-inside transmitting antenna is disposed at the center in a vehicle width direction; FIGS. 6A and 6B for a case in which the vehicle-inside transmitting antenna is disposed below a driver's seat.

DETAILED DESCRIPTION OF THE INVENTION

Hereinafter, preferred embodiments of the smart keyless entry system according to the present invention will be described referring to the accompany drawings.

At first, however, layout and an output range of a vehicle-inside transmitting antenna of a conventional smart keyless entry system will be explained referring to FIGS. 6A, 6B and 6C in order to help the understanding of the present invention easier.

Figure 6A:
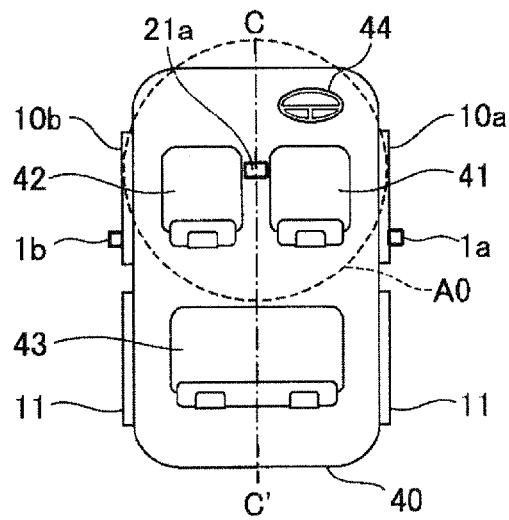
FIGS. 6A, 6B, 6C are explanatory diagrams of output ranges of transmitting antennas.
Figure 6B:
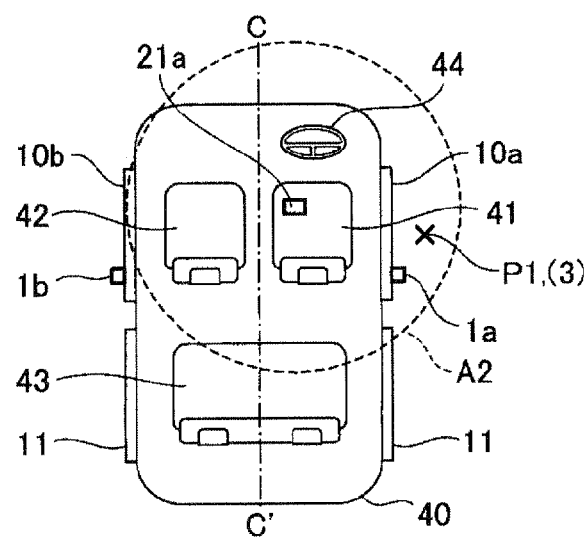
Figure 6C:
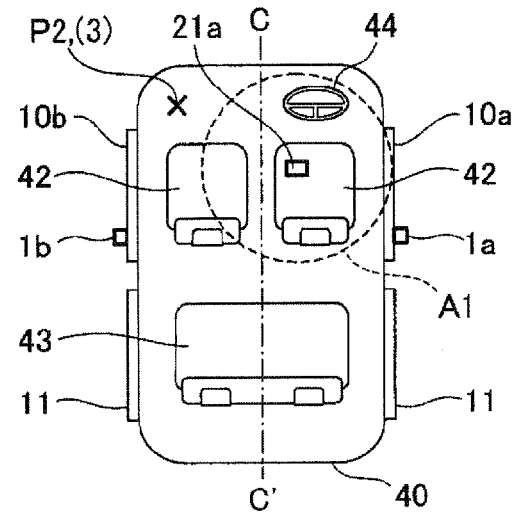

FIGS. 6A, 6B and 6C are schematic plan views of a vehicle compartment of the vehicle. A driver's seat 41 and a passenger's seat 42 are provided at a front portion, and a rear seat 43 is provided at a rear portion in the vehicle compartment. Herein, the driver's seat 41 is applied to a right-side front seat at which a steering 44 is provided.

In an example shown in FIG. 6A, a vehicle-inside transmitting antenna 21a operative to cover the front portion in the vehicle compartment is disposed at a console between the driver's seat 41 and the passenger's seat 42, namely on the center line C-C' in the vehicle width direction. An output range of a request signal from the vehicle-inside transmitting antenna 21a which is receivable by a portable device is of a substantially circular shape A0, shown by a broken line, with its center at the vehicle-inside transmitting antenna 21a. Thus, the output strength of the conventional vehicle-inside transmitting antenna 21a is set to be a constant (fixed) value so as to reach both-side doors 10a, 10b at the vehicle front portion. Herein, another vehicle-inside transmitting antennae, not illustrated, is provided on the center line C-C' of the rear seat, so that the rear portion in the vehicle compartment 40 is covered within the output range as well.

When an access switch 1a of the door 10a on the side of the driver's seat 41, or an access switch 1b of the door 10b on the side of the passenger's seat 42 are operated, an onboard device transmits the request signal from the vehicle-inside transmitting antenna 21a in the vehicle compartment. The portable device receives the request signal and then transmits a receipt-acknowledgement signal. Herein, if the onboard device receives the receipt-acknowledgement signal, it is determined (recognized) that the portable device exists inside the vehicle compartment. Meanwhile, if the onboard device does not receive the receipt-acknowledgement signal despite the transmission of the request signal by the onboard device, it is determined that the portable device exists outside the vehicle compartment.

Meanwhile, there is a case in which it is difficult to provide the vehicle-inside transmitting antenna 21a at the console from the layout needs or the like. In another example shown in FIGS. 6B and 6C, the vehicle-inside transmitting antenna 21a is disposed below the driver's seat 41, which is off the center line C-C' of the vehicle in the vehicle width direction. In this case, the distance from the vehicle-inside transmitting antenna 21a to the door 10a on the side of the driver's seat 41 is shorter than the distance from the vehicle-inside transmitting antenna 21a to the door 10b on the side of the passenger's seat 42.

Herein, if the output strength of the vehicle-inside transmitting antenna 21a is set to be stronger in such a manner the output range can expand to the far-side door 10b on the side of the passenger's seat 42, as shown by an circle A2 indicated by a broken line in FIG. 6B, the front portion in the vehicle compartment 40 may be fully covered.

This expansion of the output range results in the output range covering an area outside the door 10a of the driver's seat 41. That is, when the portable device 3 is located at the position P1 shown by a mark of "X" in FIG. 6B, the portable device 3 transmits the receipt-acknowledgement signal in response to receiving the request signal. Accordingly, it is determined that the portable device 3 at the position P1 exists inside the vehicle compartment. As a result, there is a concern that the lock/unlock of the door 10a is not conducted despite the existence of the portable device 3 outside the vehicle compartment 40.

Meanwhile, if the if the output strength of the vehicle-inside transmitting antenna 21a is set to be weaker in such a manner the output range reach only the near-side door 10a on the side of the driver's seat 41, as shown by an circle A2 indicated by a broken line in FIG. 6C, the above-described mistaken determination that the portable device 3 at the outside position P1 exists inside the vehicle compartment 40 may be avoided.

This reduction of the output range results in the output range not covering an area near the door 10b of the passenger's seat 42 in the vehicle compartment. That is, when the portable device 3 is located at the position P2 shown by the mark of "X" in FIG. 6C, the portable device 3 does not receive the request signal and therefore does not transmit the receipt-acknowledgement signal. Accordingly, it is determined that the portable device 3 at the position P2 exists outside the vehicle compartment. As a result, there is a concern that the lock/unlock of the door 10a is conducted despite the existence of the portable device 3 inside the vehicle compartment 40, so that the portable device 3 is left in the vehicle compartment improperly.

As described above, the setting the output strength of the vehicle-inside transmitting antenna 21a to be the constant value cannot provide the proper output range. The present invention, however, can provide the smart keyless entry system which can properly recognize (determine) whether the portable device is located inside the vehicle compartment or outside the vehicle compartment even if the transmitter operative to transmit the request signal in the vehicle compartment is disposed at the specified position which is off the center line of the vehicle compartment in the vehicle width direction, as described below.

Embodiment 1

Figure 1:
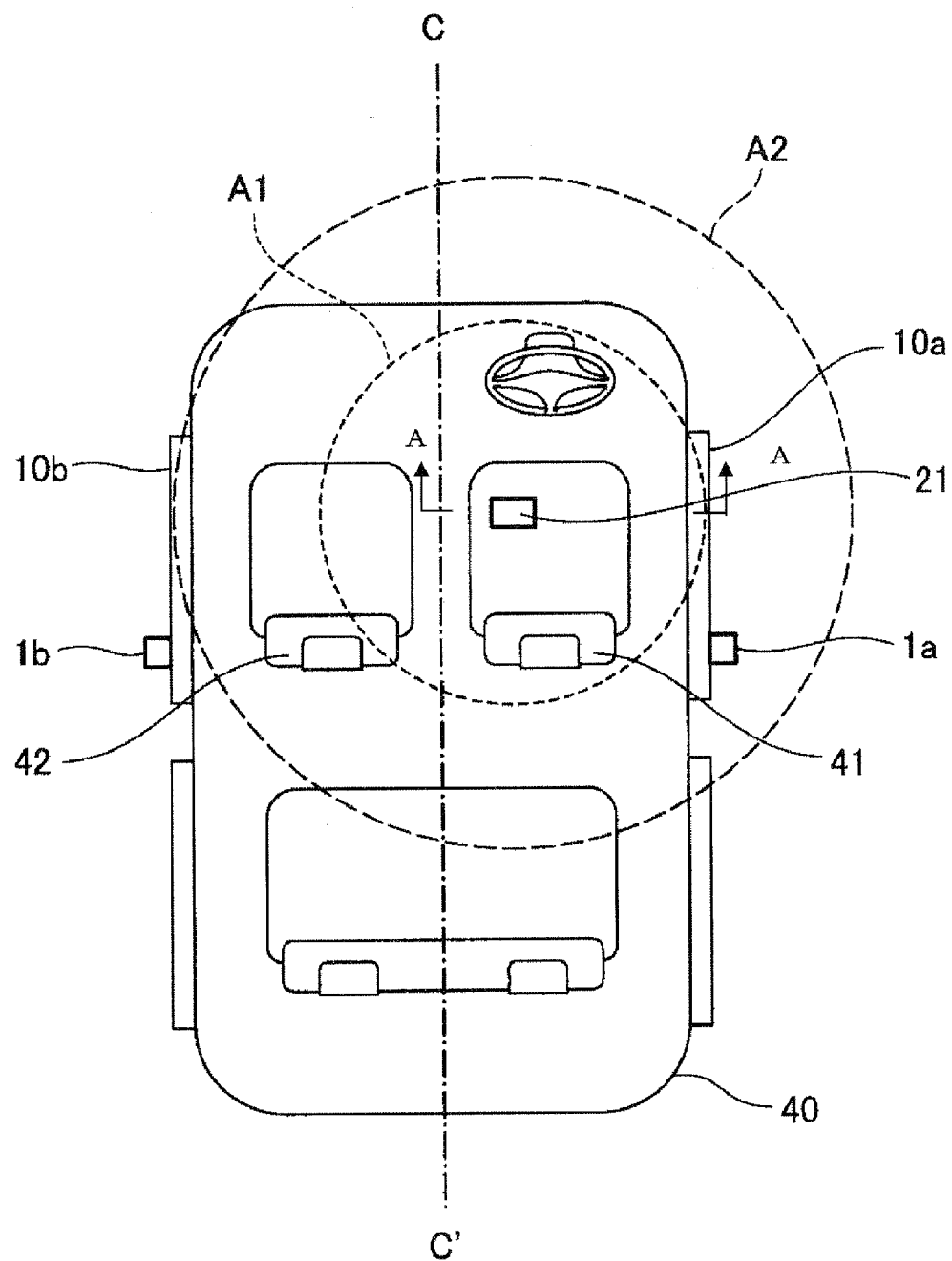
FIG. 1 is an explanatory diagram of layout and an output range of a switching transmitting antenna of a smart keyless entry system according to a first embodiment of the present invention.
Figure 7:
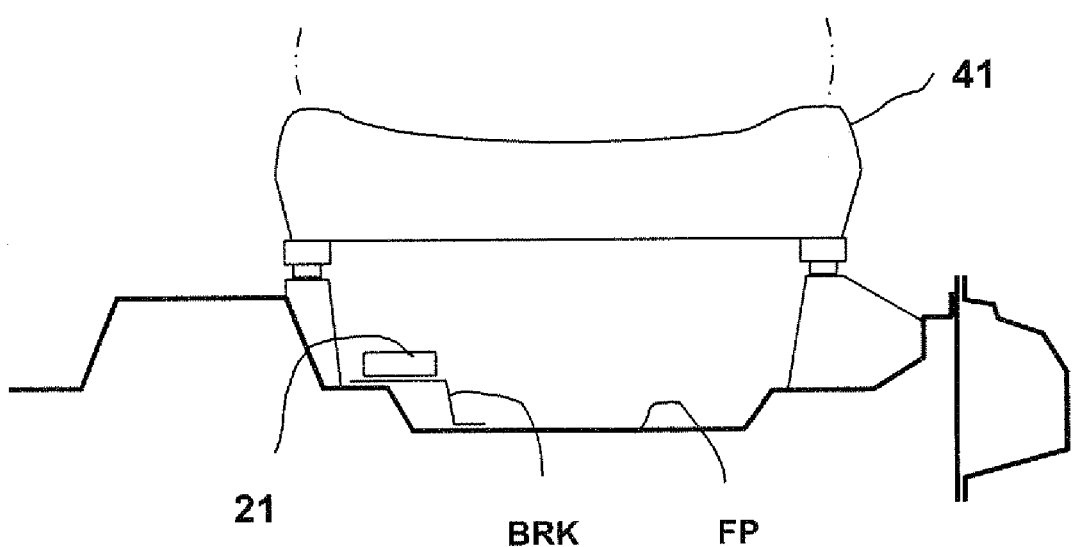
FIG. 7 is a perspective view taken along line A-A of FIG. 1.

Hereinafter, a first embodiment of the smart keyless entry system of the present invention will be described. A basic concept of the present invention will be described referring to FIG. 1 in the first embodiment. FIG. 1, which is a schematic plan view of the vehicle compartment of the vehicle, shows the layout and the output range of a switching transmitting antenna of vehicle-inside transmitting antennas. FIG. 7 is a perspective view taken along line A-A of FIG. 1.

In the present embodiment, a vehicle-inside transmitting antenna 21 to transmit the request signal in the vehicle compartment is disposed below the driver's seat 41, which is off the center line C-C' on the right side of the vehicle compartment. The vehicle-inside transmitting antenna 21 is fixed to a floor panel FP below the driver's seat 41 via a bracket BRK. The onboard device (not illustrated) is configured so as to switch the output strength of the request signal transmitted by the switching transmitter 21 in such a manner that a receivable output range of the request signal by the portable device (not illustrated) reaches one of the doors 10a, 10b which is equipped with the switch 1a or 1b which has been operated.

For example, in a case in which the access switch 1a of the door 10a of the driver's seat 41 is operated, the output strength of the vehicle-inside transmitting antenna 21 is set to be weaker, as shown by a broken-line circle A1 in FIG. 1, in such a manner that the output range reaches the door 10a on the side of the driver's seat 41. In this case, the portable device generally exists outside the door 10a of the driver's seat 41, which is out of the output range A1 of the vehicle-inside transmitting antenna 21. Accordingly, it is properly determined that the portable device outside the door 10a of the driver's seat 41 exists outside the vehicle compartment.

The portable device is generally carried by a passenger to operate the access switch 1a. Accordingly, in this case, the portable device does not generally exist inside the vehicle compartment on the side of the passenger's seat. Therefore, there may be no problem with that the area near the door 10b of the passenger's seat 42 which is far from the vehicle-inside transmitting antenna 21 is out of the output range as a practical matter.

On the other hand, in a case in which the switch 1b of the door 10b of the passenger's seat 42, the output strength of the vehicle-inside transmitting antenna 21 is set to be stronger, as shown by a broken-line circle A2 in FIG. 1, in such a manner that the output range expands to the door 10b of the passenger's seat 42. In this case, the portable device generally exists outside the door 10a of the driver's seat 41. Accordingly, it is properly determined that the portable device outside the door 10b of the passenger's seat 42 exists outside the vehicle compartment.

The portable device is generally carried by a passenger to operate the access switch 1b. Accordingly, in this case, the portable device does not generally exist outside the door 10a of the driver's seat 41. Therefore, there may be no problem with that the area outside the door 10b of the passenger's seat 42 is included within the output range as a practical matter.

As described above, according to the present embodiment, it can be properly recognized whether the portable device is located inside the vehicle compartment or outside the vehicle compartment even if the vehicle-inside transmitting antenna 21 to transmit the request signal in the vehicle compartment is disposed at the specified position which is off the center line C-C' of the vehicle compartment 40 in the vehicle width direction. Herein, the output strength of the vehicle-inside transmitting antenna may be set to appropriate values for the above-described respective cases of being stronger and weaker, which can be obtained through experiments.

Embodiment 2

Figure 2:
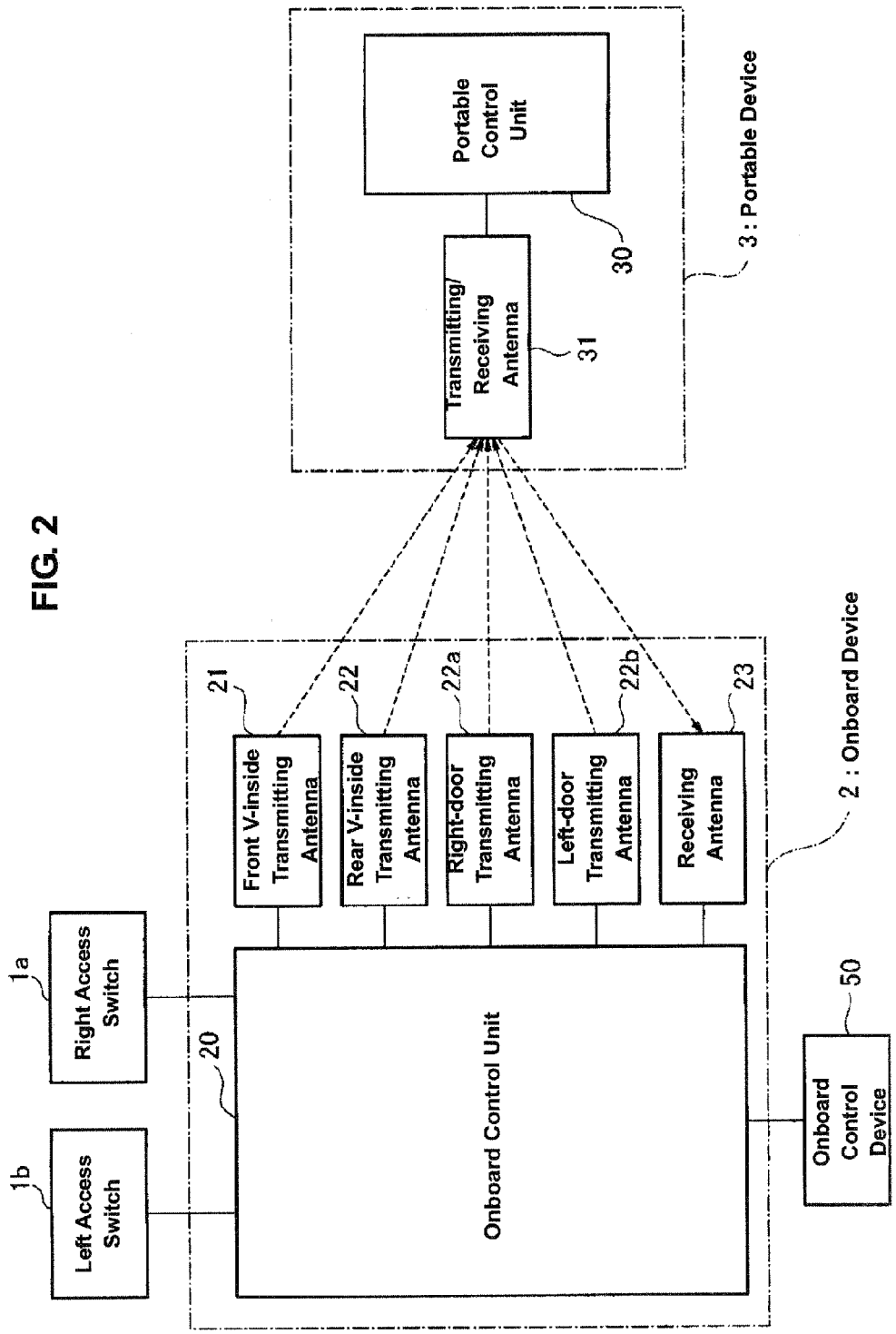
FIG. 2 is a block diagram showing constitution of a smart keyless entry system according to a second embodiment of the present invention.

Next, the smart keyless entry system of a second embodiment of the present invention will be described. At first, the basic constitution of the smart keyless entry system according to the present invention will be described referring to FIG. 2. FIG. 2 is a block diagram to show the smart keyless entry system of the present embodiment.

As shown in FIG. 2, the smart keyless entry system of the present embodiment comprises the access switches 1a, 1b which are provided at outer faces of both-side doors of the vehicle, an onboard device 2 operative transmit the request signal of the LF band in response to operation of the access switches 1a, 1b, and the portable device 3 operative to transmit the receipt-acknowledgement signal of the UHF band in response to receiving the request signal. Herein, in FIG. 2, the access switch 1a provided at the outer face of the door on the side of the driver's seat is indicated as "right access switch," and the access switch 1b provided at the outer face of the door on the side of the passenger's seat is indicated as "left access switch."

The onboard device 2 comprises an onboard control unit 20, a front vehicle-inside transmitting antenna 21 to transmit the request signal, a rear vehicle-inside transmitting antenna 22, a right-door transmitting antenna 22a on the side of the driver's seat, a left-door transmitting antenna 22b on the side of the passenger's seat, and a receiving antenna 23 to receive the receipt-acknowledgement signal. Further, the potable device comprises a manner control unit 30 and a transmitting/receiving antenna 31 to receive the request signal and transmit the receipt-acknowledgement signal.

The onboard control unit 20 of the portable device 2 activates the onboard control device 50, such as a door lock/unlock mechanism, in response to receiving the receipt-acknowledgement signal. The onboard control unit 20 and the manner control unit 30 may be materialized by a programmable computer or a semiconductor chips.

The front and rear vehicle-inside transmitting antennas 21, 22 transmit the request signals in the vehicle compartment, respectively. The right-door transmitting antenna 22a and the left-door transmitting antenna 22b transmit the request signals in the vehicle compartment and outside the vehicle compartment, respectively. Accordingly, unless the portable device 3 transmits the receipt-acknowledgement signal in response to the request signal transmitted by the right-door transmitting antenna 22a or the left-door transmitting antenna 22b and transmits the receipt-acknowledgement signal in response to the request signal transmitted by the vehicle-inside transmitting antennas 21, 22, it is determined that the portable device 3 exists outside the vehicle compartment.

Meanwhile, if the portable device 3 transmits the receipt-acknowledgement signal in response to the request signal transmitted by the right-door transmitting antenna 22a or the left-door transmitting antenna 22b and also transmits the receipt-acknowledgement signal in response to the request signal transmitted by the vehicle-inside transmitting antennas 21, 22, it is determined that the portable device 3 exists inside the vehicle compartment.

Figure 3:
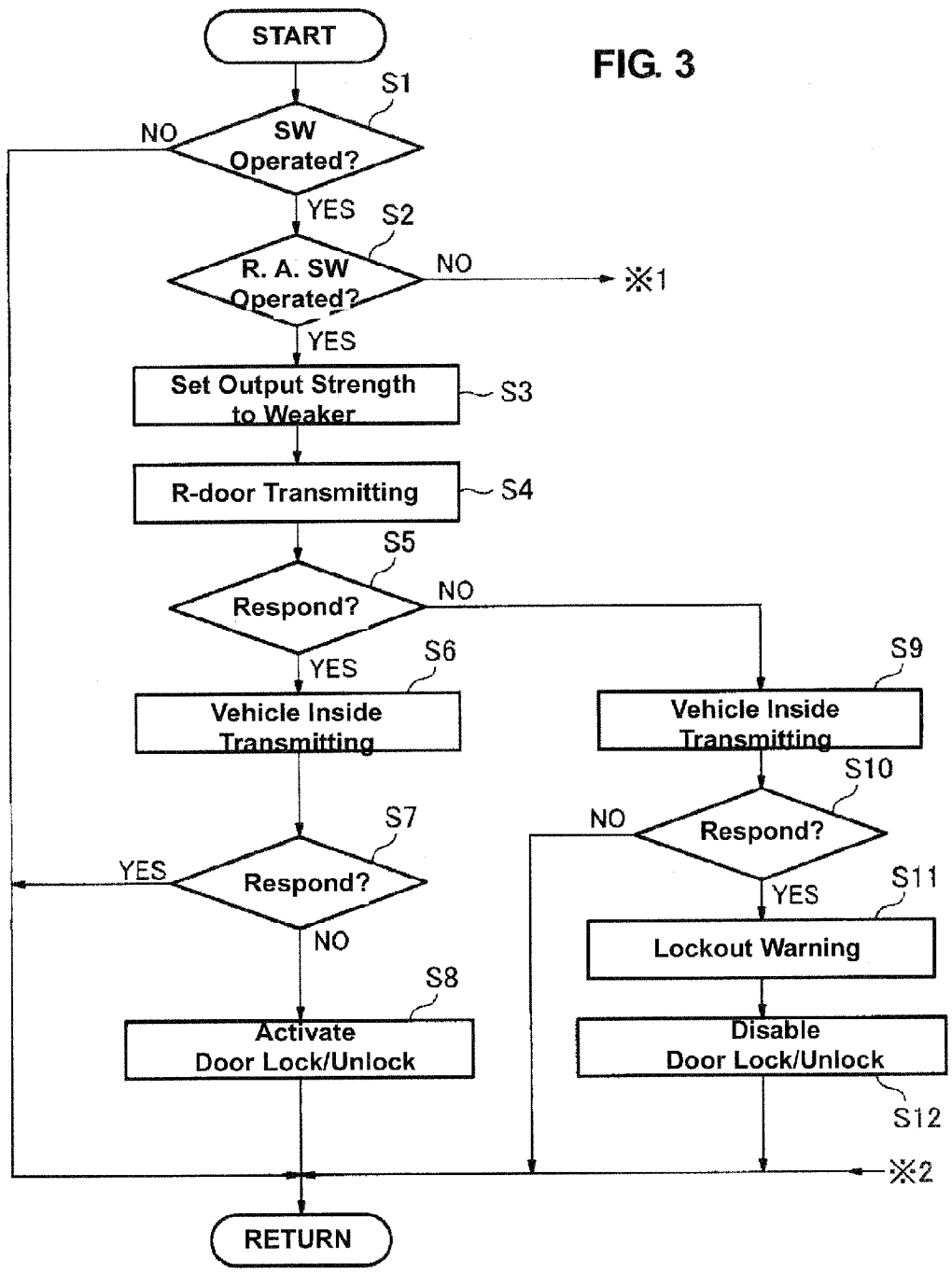
FIG. 3 is a flowchart explaining operations of the smart keyless entry system according to the second embodiment of the present invention.
Figure 4:
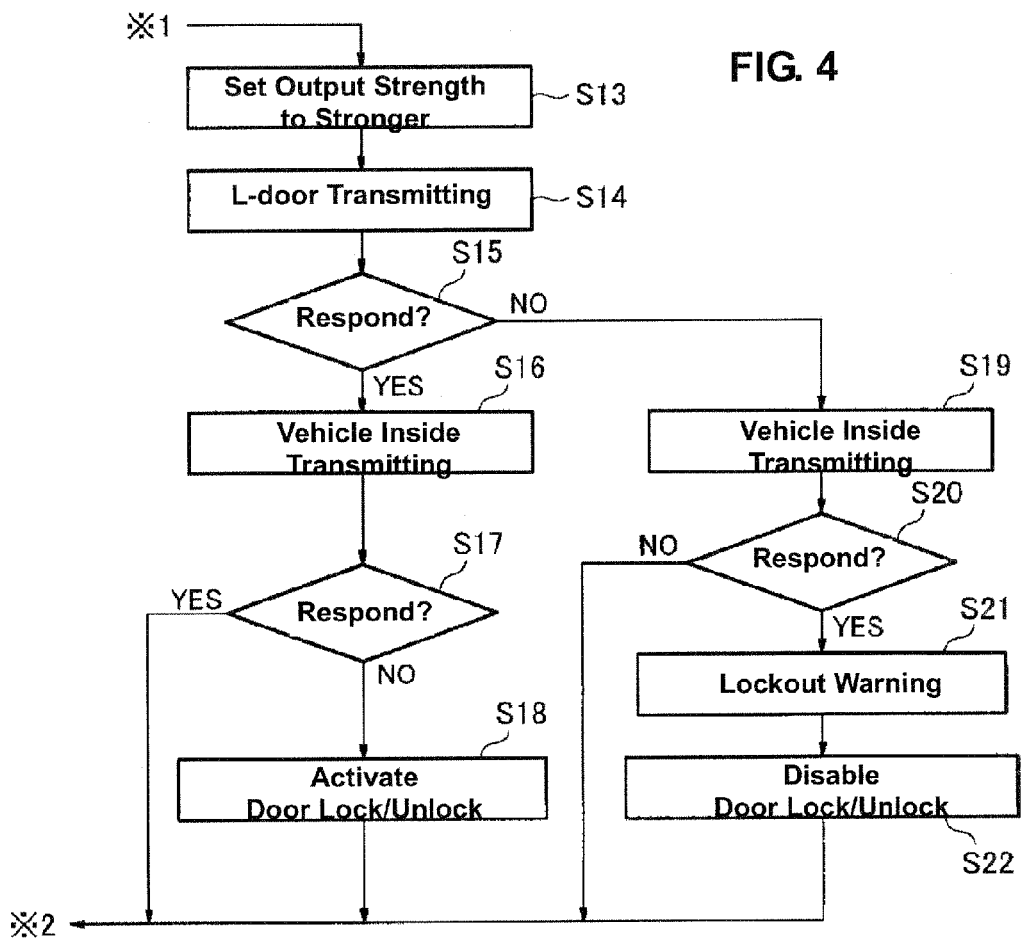
FIG. 4 is a flowchart which follows the flowchart of FIG. 3.
Figure 5A:
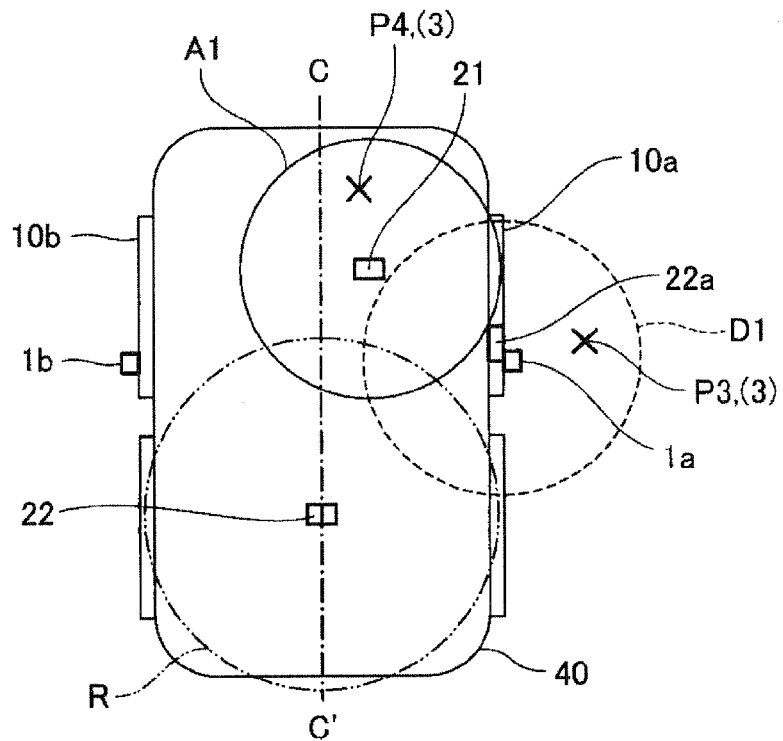
FIGS. 5A, 5B are explanatory diagrams of layouts and output ranges of transmitting antennas of the smart keyless entry system according to the second embodiment of the present invention.
Figure 5B:
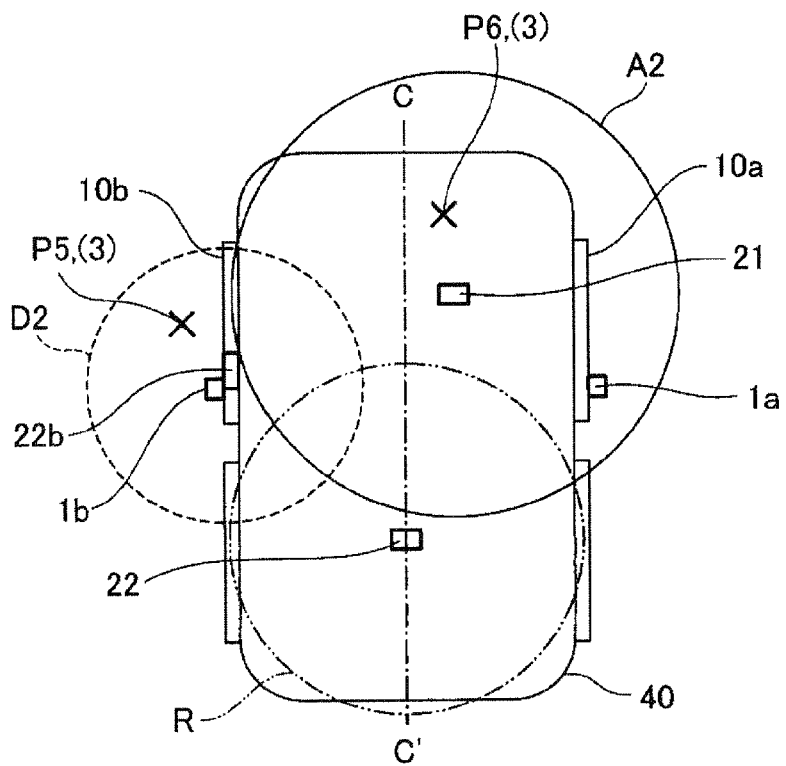

Next, the operation of the smart keyless entry system of the second embodiment will be described referring to the flowcharts of FIGS. 3 and 4. According to the second embodiment, as shown in FIGS. 5A and 5B, the vehicle-inside transmitting antenna 21 is disposed below the driver's seat off the center line C-C' in the vehicle width direction. The vehicle-inside transmitting antenna 21 is a switching transmitting antenna operative to switch the output strength as described below.

Meanwhile, the rear vehicle-inside transmitting antenna 23 is disposed substantially on the center line C-C'. The right-door transmitting antenna 22a is disposed at the door 10a of the driver's seat as shown in FIG. 5A. The left-door transmitting antenna 22b is disposed at the door 10b of the passenger's seat as shown in FIG. 5B. The illustrations of the front seat, rear seat, steering wheel are omitted in FIGS. 5A and 5B.

When the right access switch 22a outside the door 10a of the driver's seat or the left access switch 22b outside the door 10b of the passenger's seat are operated (YES in step S1), the onboard control unit 20 determines whether the right access switch 1a is operated or the left access switch 1b is operated (S2).

When the right access switch 1a is operated (YES in the step S2), the onboard control unit 20 sets the output strength of the front vehicle-inside transmitting antenna 21 to be weaker in such a manner that the output range reaches the right door 10a of the driver's seat as shown by a solid-line circle A1 in FIG. 5A (S3). Herein, the processing of step S3 needs to be executed when the vehicle-inside transmitting antenna 21 transmits the request signal or before the request signal is transmitted in the vehicle compartment. The order of processing steps may be changed as long as the execution of the step S3 is conducted as described above.

Next, the onboard control unit 20 transmits the request signal from the right-door transmitting antenna 22a (S4).

The output range of the right-door transmitting antenna 22a is shown by a broken-line circle D1 in FIG. 5A. In a case in which the portable device 3 shown by the mark "X" is located at the position P3 which is inside the output range D1, the portable device 3 transmits the receipt-acknowledgement signal in response to the request signal. When the receiving antenna 23 (not illustrated in FIG. 5) receives the receipt-acknowledgement signal (YES in step S5), the onboard control unit 20 transmits the request signals from the front vehicle-inside transmitting antenna 21 and the rear vehicle-inside transmitting antenna 22 respectively (S6).

Herein, the output range A1 of the front vehicle-inside transmitting antenna 21 is set to be so narrow in the step S3 that the request signal just reaches the right door 10a. The output range of the rear vehicle-inside transmitting antenna 22 is set, as shown by a two-dotted-broken-line circle R in FIG. 5A, in such a manner that it covers the both rear doors.

Herein, the position P3 of the portable device 3 is out of the output range of the transmitting antennas 21, 22. Accordingly, the portable device 3 does not receive the request signal. Thus, the portable device 3 does not respond, namely it does not transmit the receipt-acknowledgement signal. As a result, the onboard control unit 20 does not receive the receipt-acknowledgement signal within a specified time (several tens of seconds) from the transmission timing of the request signal. In this case (NO in step S7), the onboard control unit 20 determines that the portable device 3 exists outside the vehicle compartment 40, and then activates the door lock/unlock mechanism (S8).

In a case in which the portable device 3 shown by the mark "X" is located at the position P4 which is outside the output range D1, the portable device 3 does not respond to the request signal from the vehicle-inside transmitting antenna 21 and does not transmit the receipt-acknowledgement signal. Accordingly, the receiving antenna does not receive the receipt-acknowledgement signal (NO in the step S5). In this case, likewise, the onboard control unit 20 transmits the request signals from the front vehicle-inside transmitting antenna 21 and the rear vehicle-inside transmitting antenna 22 respectively (S9).

Herein, the position P4 of the portable device 3 is in the output range A1 of the transmitting antenna 21. Accordingly, the portable device 3 receives the request signal, and transmits the receipt-acknowledgement signal. When the receiving antenna of the onboard 2 receives the receipt-acknowledgement signal (YES in step S10), the onboard control unit 20 determines that the portable device 3 exists inside the vehicle compartment 40, and then warns for key-lockout prevention (S11) and disables the door lock/unlock mechanism (S12).

When the left access switch 1b is operated (NO in the step 2), the onboard control unit 20 set the output strength of the front vehicle-inside transmitting antenna 21 to be stronger, as shown by a solid-line circle A2 in FIG. 5B, in such a manner that the output range covers the left door 10b of the passenger's seat. Herein, the processing of step S13 needs to be executed when the vehicle-inside transmitting antenna 21 transmits the request signal or before the request signal is transmitted in the vehicle compartment. The order of processing steps may be changed as long as the execution of the step S13 is conducted as described above.

Next, the onboard control unit 20 transmits the request signal from the left-door transmitting antenna 22b (S14). The output range of the right-door transmitting antenna 22a is shown by a broken-line circle D2 in FIG. 5B. In a case in which the portable device 3 shown by the mark "X" is located at the position P5 which is inside the output range D2, the portable device 3 transmits the receipt-acknowledgement signal in response to the request signal.

When the receiving antenna 23 of the onboard device 2 receives the receipt-acknowledgement signal (YES in step S15), the onboard control unit 20 transmits the request signals from the front vehicle-inside transmitting antenna 21 and the rear vehicle-inside transmitting antenna 22 respectively (S16). Herein, the output range A2 of the front vehicle-inside transmitting antenna 21 is set to be so wide in the step S13 that the request signal can reach the left door 10a. The output range of the rear vehicle-inside transmitting antenna 22 is set, as shown by a two-dotted-broken-line circle R in FIG. 5B, in such a manner that it covers the both rear doors.

Herein, the position P5 of the portable device 3 is out of the output range of the transmitting antennas 21, 22. Accordingly, the portable device 3 does not receive the request signal. Thus, the portable device 3 does not respond, namely it does not transmit the receipt-acknowledgement signal. As a result, the onboard control unit 20 does not receive the receipt-acknowledgement signal within a specified time (several tens of seconds) from the transmission timing of the request signal. In this case (NO in step S17), the onboard control unit 20 determines that the portable device 3 exists outside the vehicle compartment 40, and then activates the door lock/unlock mechanism (S18).

In a case in which the portable device 3 shown by the mark "X" is located at the position P6 which is outside the output range D2, the portable device 3 does not respond to the request signal from the vehicle-inside transmitting antenna 21 and does not transmit the receipt-acknowledgement signal. Accordingly, the receiving antenna does not receive the receipt-acknowledgement signal (NO in the step S15). In this case, likewise, the onboard control unit 20 transmits the request signals from the front vehicle-inside transmitting antenna 21 and the rear vehicle-inside transmitting antenna 22 respectively (S19).

Herein, the position P6 of the portable device 3 is in the output range A2 of the transmitting antenna 21. Accordingly, the portable device 3 receives the request signal, and transmits the receipt-acknowledgement signal. When the receiving antenna of the onboard 2 receives the receipt-acknowledgement signal (YES in step S20), the onboard control unit 20 determines that the portable device 3 exists inside the vehicle compartment 40, and then warns for key-lockout prevention (S21) and disables the door lock/unlock mechanism (S22).

As described above, according to the present embodiment, it can be properly recognized whether the portable device is located inside the vehicle compartment or outside the vehicle compartment even if the vehicle-inside transmitting antenna 21 to transmit the request signal in the vehicle compartment is disposed at the specified position which is off the center line C-C' of the vehicle compartment 40 in the vehicle width direction.

The present invention should not be limited to the above-described embodiments, and any other modifications and improvements may be applied. For example, while the above-described embodiments show an example in which the switching transmitting antenna is disposed on the driver's seat side off the center line in the vehicle width direction, the disposition of the switching transmitting antenna should not be limited to this manner as long as it is disposed off the center line. It may be disposed on the passenger's seat side off the center line, for example, below the passenger's seat. Further, the single switching transmitting antenna is provided in the above-described embodiments, but a plurality of antennas may be provided as the switching transmitting antenna.

What is claimed is:

1. A smart keyless entry system, comprising:
   switches provided at outer faces of a right-side door and a left-side door of a vehicle;
   an onboard device operative to transmit a request signal in response to operation of the switches;
   a portable device operative to transmit a receipt-acknowledgement signal in response to receiving the request signal;
   an onboard control device to be activated by the onboard device in response to receiving the receipt-acknowledgment signal,
   wherein said onboard device comprises a determination module for determining whether the switch on the right-side door or the switch on the left-side door is operated and a vehicle-inside transmitter having a transmitting antenna to transmit the request signal in a vehicle compartment, the vehicle-inside transmitter being a switching transmitter having the transmitting antenna disposed at a specified position which is off a center line of the vehicle compartment in a vehicle width direction, and the onboard device is configured to switch an output strength of the request signal transmitted by the switching transmitter based on determination result of said determination module such that a receivable output range of the request signal by said portable device reaches one of the doors which is equipped with the switch which has been determined by the determination module to have been operated in such a manner that in a case where the switch on any one of said doors located near from the switching transmitter is operated, said output strength provides a narrow receivable output range, wherein the request signal does not reach the door equipped with the switch that has not been operated, whereas in a case where the switch on the other door located far from the switching transmitter is operated, said output strength provides the wide receivable output range so as to reach both the right-side door and the left-side door of the vehicle.

2. The smart keyless entry system of claim 1, wherein said vehicle-inside transmitter comprises a plural transmitters which are disposed at a front portion and a rear portion in the vehicle compartment respectively, and the transmitter at the front portion is said switching transmitter.

3. The smart keyless entry system of claim 1, wherein said switching transmitter at the front portion is disposed on a vehicle floor below a driver's seat.

4. The smart keyless entry system of claim 1, wherein said request signal is a signal of LF band, and said receipt-acknowledgement signal is a signal of UHF band.

* * * * *